Figure 1:
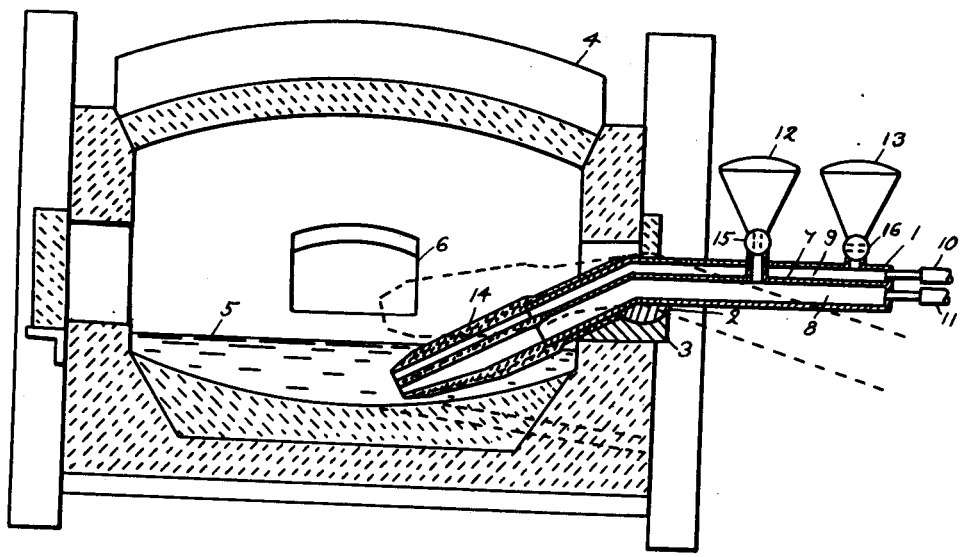

Aug. 7, 1934.          V. V. SOLDATOFF          1,968,917
                     PROCESS OF MAKING STEEL
                       Filed June 30, 1933

Vassily V. Soldatoff
INVENTOR

BY John P. Mironow
ATTORNEY

Patented Aug. 7, 1934

1,968,917

UNITED STATES PATENT OFFICE 1,968,917

PROCESS OF MAKING STEEL

Vassily V. Soldatoff, New York, N. Y.

Application June 30, 1933, Serial No. 678,386

4 Claims. (Cl. 75—44)

My invention relates to a process of making steel and has particular reference to processes or methods for treating steel, cast iron and other ferrous materials containing excess of carbon so as to produce a homogeneous steel or ferro alloy with lowered carbon content.

This application is a continuation in part of my application Serial No. 499,019, filed Nov. 29, 1930, which matured into Patent #1,949,731.

My process is especially applicable to the operations in which the excess carbon is gradually burned out of the melted bath of ferrous materials.

In the well known Bessemer process the excess carbon in the melted batch is burned out by the blast of air. The temperature is raised by burning manganese, silicon and carbon, so that the batch must contain a high percentage of these ingredients.

In my process I introduce the air into the melted bath for burning carbon only, the necessary temperature being maintained entirely by the external application of heat, although under certain conditions it is also possible to reheat the melt by the combustion of burning materials in the melt as it will be hereinafter explained. In my process, therefore, it is not necessary to use any special and costly pig iron with high manganese and silicon content. Ordinary pig iron can be used together with a large admixture of scrap iron and steel.

In view of the fact that I use external heat for melting the batch and for maintaining the required temperature during the decarbonizing operation, the latter can be conducted at a sufficiently low rate so as to insure a fully homogeneous melt with the exact characteristics desired.

In order to obtain a thorough mixing of the melt during the process, I also introduce a blast of some gas which is neutral in its reaction on the ingredients of the bath. Carbon dioxide can be used for this purpose, being introduced into the melt at a greater pressure than air and in larger quantities so as to cause violent bubbling and energetic stirring in the bath.

My process can be applied to stationary furnaces such as open hearth or electric furnaces, having provisions for the external application of heat of any suitable size and construction, by adding refractory pipes through which the gases and materials are introduced for my process. The pipes must be made so that they can be raised from the melt when the blast of gases is stopped.

My process can be also applied to rotary or tilting furnaces, which must be provided with pipes or ducts in the side walls for my gases. The furnace can be tilted so as to cover the ducts with the melted metal during blasting, and tilted in the opposite direction when the blast is stopped.

My invention is more fully described in the accompanying specification and drawing in which—

Figure 2:
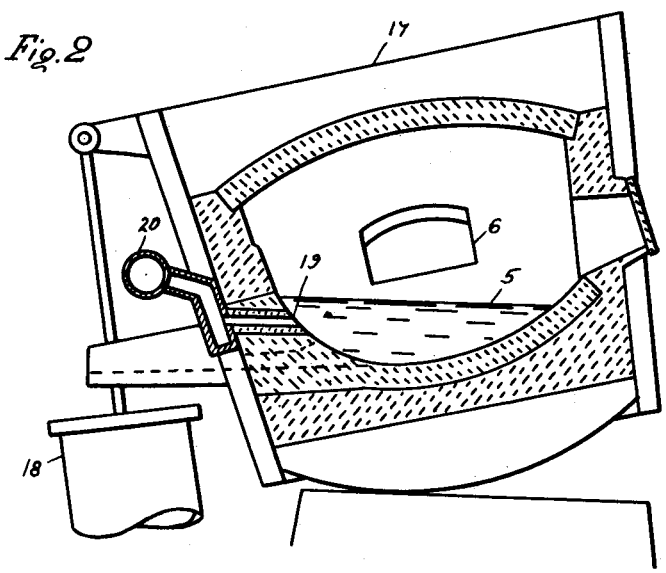

Fig. 1 is a sectional elevation of a steel melting furnace with my tilting pipe, and Fig. 2 is a sectional elevation of a rotary furnace with ducts for gases.

In a typical arrangement for my process as shown in Fig. 1, the pipe 1 is provided with a cylindrical fulcrum 2 resting on a metal bearing 3 supported on the side wall of a steel melting furnace 4. The heat for melting the metal bath 5 is applied through ports 6. The inner end of the pipe is bent down so as to be immersed into the bath for blasting operation. It can be removed from the bath by turning the pipe as shown with dotted lines.

The pipe is separated by an internal wall 7 into two channels, 8 and 9. Flexible pipes 10 and 11 extend from these channels. Hoppers 12 and 13 are mounted on the pipe being in communication with the channels 8 and 9 respectively. The end portion 14 of the pipe is made of a high grade refractory material, preferably reinforced by braces or mesh of some highly refractory alloy.

A similar construction is also shown in my above mentioned patent application.

Valves 15 and 16 connect the hoppers with the respective channels. The channels may be made of different cross-sectional area, the smaller being used for air, and the larger—for the inert gas.

The operation of the arrangement is as follows. The batch containing ordinary cheap pig iron with a large percentage of scrap iron is melted in the furnace by the application of external heat through the ports 6. The air is then blown into the melt through the smaller channel 9, the pipe being lowered into its operative position with the end submerged in the melt. The amount of air is regulated in accordance with the desired reduction in the carbon content of the melt. Carbon dioxide is blown at the same time through the larger channel 8, in larger volume and at the greater pressure than the air in the channel 9, so as to produce violent bubbling in the melt. The energetic stirring and mixing action of the inert gas tends to render the product more homogeneous in its composition. The simultaneous blast through both channels also tends to keep the channels free from the metal.

Often it is found that better product is obtained if the decarburizing process is carried farther than necessary to obtain the desired carbon content, the latter being finally obtained by adding some carbon to the melt at the end of the oxidizing operation. For this purpose some de-oxidizing (recarburizing) material may be added to the neutral gas at the completion of the first stage of the blasting operation. This material is kept in powdered form in the hopper 12, and is admitted into the neutral gas blast by opening the valve 15. Any ordinary deoxidizing material may be used for this purpose, such as carbon with silicon and manganese.

If it is desired to raise the temperature of the melt at the end of the blasting process, then a combustible material may be introduced into the melt with the blast of air. Any ordinary combustible material may be used for this purpose, such as carbon, or carbon with aluminum and magnesium. This material is kept in powdered form in the hopper 13 and can be admitted into the blast of air by opening the valve 16.

*Example*

A 100 ton furnace is charged with 50 tons of pig iron and 50 tons of scrap iron. Pig iron contains 4.25% of carbon, and the scrap has 0.25% of carbon, so that the average carbon content of the batch is 2.25%. It is desired to produce steel with 0.30% of carbon.

According to the reaction of complete combustion, 12 lbs. of carbon require 32 lbs. of oxygen, or 1 lb. of carbon requires 2¾ lbs. of oxygen.

For the complete combustion it is necessary to have about 50% excess of oxygen, so that for burning 2% of carbon or 2 tons it is necessary to supply 8 tons of oxygen, or 34.8 tons of air containing 18.6% of oxygen, or 980,000 cb. ft. With this amount of air carbon will be reduced to 0.25%, which amount will be then raised to 0.30% by the introduction of recarburizing (deoxidizing) materials.

The application of my process to a rotary furnace 17 is shown in Fig. 2. A hydraulic cylinder 18 may be used for tilting the furnace. In its inclined position the melt 5 covers apertures 19 in the wall of the furnace. There is a row of these apertures connected with pipes 20. Air is blown through some of these apertures and carbon dioxide through the others. Upon completion of the blowing the furnace is tilted back until the melted metal is ready to be poured out.

Important advantages of my process, especially over the Bessemer process, are that I can use cheap batch ingredients with ordinary pig iron, which need not contain manganese and silicon, and which can be mixed with a large amount of scrap iron. Air in my process is not used for raising the temperature, except under certain conditions, so that a much reduced amount of blast is required. Any type and size of furnace may be used, and it can be easily adapted for the use with my process. The quality of the product is higher due to the slower and better controlled oxidizing and deoxidizing operations, giving also more time for the gases to escape while the melt is still hot, leaving same in a purer and more homogeneous condition.

I claim as my invention:

1. A process of making steel, consisting in melting together a mixture of pig iron and scrap iron, reducing the carbon content in the melt by blowing air into said melt while maintaining the application of the melting heat from the outside source to said melt, and agitating said melt by blowing inert gas into said melt simultaneously with the air but separately therefrom.

2. A process for making steel, consisting in melting together a mixture of pig iron and scrap iron, reducing the carbon content of the melt by blowing air into said melt while maintaining the application of the melting heat from the outside source to said melt, agitating said melt by blowing inert gas into said melt simultaneously with the air but separately therefrom, and separately regulating the relative amounts and pressures of said air and said neutral gas.

3. A process of making steel, consisting in melting together a mixture of pig iron and scrap iron, reducing the carbon content of the melt below the final desired content by blowing air into said melt while maintaining the application of the melting heat from the outside source to said melt, agitating said melt by blowing inert gas into said melt simultaneously with said air but separately therefrom, separately regulating the relative amounts and pressures of said gases, and increasing the carbon content to the desired limit by adding recarburizing materials to said inert gas.

4. A process of making steel, consisting in melting together a mixture of pig iron and scrap iron, reducing the carbon content of the melt by blowing air through said melt while maintaining the application of the melting heat from the outside source to said melt, agitating and mixing said melt by blowing inert gas into said melt simultaneously with said air, separately regulating the relative amounts and pressures of said gases, increasing the carbon content of said melt by introducing recarburizing materials with said inert gas, and increasing the temperature of said melt by introducing combustible materials with said air.

VASSILY V. SOLDATOFF.